(12) United States Patent  
Klee

(10) Patent No.: US 7,189,070 B2
(45) Date of Patent: *Mar. 13, 2007

(54) DEVICE FOR IMPREGNATING AN INSULATION OF A WINDING BAR OF AN ELECTRICAL MACHINE

(75) Inventor: Peter Klee, Mannheim (DE)

(73) Assignee: Alston Technology Ltd, Baden (CH)

( * ) Notice: Subject to any disclaimer, the term of this patent is extended or adjusted under 35 U.S.C. 154(b) by 0 days.

This patent is subject to a terminal disclaimer.

(21) Appl. No.: 11/003,086

(22) Filed: Dec. 3, 2004

(65) Prior Publication Data

US 2005/0077397 A1 Apr. 14, 2005

Related U.S. Application Data

(60) Division of application No. 10/178,695, filed on Jun. 24, 2002, now Pat. No. 6,840,749, which is a continuation of application No. PCT/EP00/12630, filed on Dec. 13, 2000.

(30) Foreign Application Priority Data

Dec. 23, 1999 (DE) ................................. 199 62 290

(51) Int. Cl.
*B29C 45/14* (2006.01)
(52) U.S. Cl. .................... 425/116; 425/129.1; 425/389; 425/405.1
(58) Field of Classification Search ................ 425/116, 425/129.1, 389, 405.1
See application file for complete search history.

(56) References Cited

U.S. PATENT DOCUMENTS 2,783,171 A   2/1957  Thiessen 5,863,452 A   1/1999  Harshberger et al.

FOREIGN PATENT DOCUMENTS

| DE | 19 26 356 B2 | 11/1970 |
| DE | 31 38 766 A1 | 4/1983 |
| DE | 198 35 361 A1 | 2/2000 |
| EP | 0 831 575 A1 | 3/1998 |
| JP | 57 013 728 | 1/1982 |
| JP | 61 214 750 | 9/1986 |
| JP | 61 220 814 | 10/1986 |
| JP | 06 141 521 | 5/1994 |
| JP | 06 153 466 | 5/1994 |
| SU | 1 819 367 A3 | 5/1993 |

*Primary Examiner*—Tim Heitbrink
(74) *Attorney, Agent, or Firm*—Laurence A. Greenberg; Werner H. Stemer; Ralph E. Locher

(57) ABSTRACT

A device for impregnating an insulation of a winding bar of an electric machine includes a container accommodating the winding rod and connected to a tank containing an impregnation agent. The container, which remains open during the impregnation process, is surrounded by an evacuation container to create a negative pressure within the container. To achieve a more rapid penetration of the impregnation agent and to simplify the overall process, a vacuum-tight sleeve acts as the container, the sleeve being encompassed by a pressure-resistant sleeve, and a conduit of an assembly that generates a vacuum leads into the interior of the sleeve. The impregnation agent is supplied with a pressure that is lower than the prevailing pressure in the pressure-resistant sleeve. The container can be a multi-part tool defining an interior for surrounding and accommodating the winding bar in a positive fit at least during an evacuation and impregnation process.

7 Claims, 3 Drawing Sheets

DEVICE FOR IMPREGNATING AN INSULATION OF A WINDING BAR OF AN ELECTRICAL MACHINE

This is a divisional application of application Ser. No. 10/178,695, filed Jun. 24, 2002; now U.S. Pat. No. 6,840,749 which was a continuing application, under 35 U.S.C. §120, of International application PCT/EP00/12630, filed Dec. 13, 2000; the application also claims the priority, under 35 U.S.C. §119, of German patent application No. 199 62 290.6, filed Dec. 23, 1999; the prior applications are herewith incorporated by reference in their entirety.

BACKGROUND OF THE INVENTION

Field of the Invention

The invention relates to a device for impregnating an insulation of a winding bar of an electric machine having an evacuable container that accommodates the winding bar and that is connected to a tank containing an impregnating agent, the impregnating agent flowing into the container with a predeterminable pressure.

A similar device is described in European Patent Application EP 0 831 575 A1, where the container is a mold into which the winding bar is inserted. The mold, which can be covered with a lid, is disposed in an evacuation tank so that a vacuum can be maintained in the tank when the lid is open. The lid remains open during the in-feed of the impregnating agent. The lid is moved into closed position only when a predeterminable fill level is achieved. Furthermore, the evacuation tank requires a large space. Taken as a whole, such a configuration entails a complicated tool assembly and processing sequence.

SUMMARY OF THE INVENTION

It is accordingly an object of the invention to provide a device for impregnating an insulation of a winding bar of an electrical machine that overcomes the hereinafore-mentioned disadvantages of the heretofore-known devices of this general type and that brings about a more rapid penetrating of impregnating agent into the insulation with less outlay.

With the foregoing and other objects in view, there is provided, in accordance with the invention, a device for impregnating an insulation of a winding bar of an electric machine, including a vacuum-tight, pressure-tight, flexible sleeve for completely surrounding and accommodating the winding bar, the sleeve defining an evacuable interior, a pressure-resistant container enclosing the sleeve to form a space therebetween, the space to be charged with a first predeterminable pressure, a tank for holding an impregnating agent, the tank fluidically connected to the sleeve and supplying the impregnating agent to the sleeve at a second predetermined pressure less than the first predetermined pressure; and a vacuum-forming device having a vacuum line fluidically connected to the interior for supplying a vacuum to the interior.

Accordingly, the container is a vacuum-tight, pressure-tight, flexible sleeve that completely surrounds the winding bar. A pressure-resistant sleeve encompasses the vacuum-tight sleeve. The space between the two sleeves is charged with a predeterminable pressure. A pressure deficit is generated in the first sleeve with the aid of a line that is connected to the interior of the vacuum-tight sleeve. The pressure of the isolating agent flowing into the first sleeve is less than the pressure present in the pressure-resistant sleeve.

Because the container is closed, the directly connected vacuum generator can generate the required vacuum more quickly. Besides a closed, emission-free process, short impregnation times are achieved. The differential pressure between the interior of the container and the interior of the pressure-resistant sleeve serves to press and pack the impregnating insulation.

In accordance with another feature of the invention, the sleeve is a thermo-shrinking hose and/or an elastic hose.

In accordance with a further feature of the invention, the sleeve has a subregion and a calibrating body surrounds the winding bar with a positive fit and surrounds the subregion.

In accordance with an added feature of the invention, there is provided a calibrating body adapted to surround the winding bar with a positive fit.

In accordance with an additional feature of the invention, the calibrating body is disposed between the sleeve and the container.

In accordance with yet another feature of the invention, the pressure-resistant container is a pressure-resistant sleeve.

In accordance with yet a further feature of the invention, the pressure-resistant sleeve is at least one of a flexible fabric-reinforced hose, a flexible metallic hose, and a metallic hose.

In accordance with yet an added feature of the invention, the container is at least one of metallic segmented pressure pipes, non-metallic segmented pressure pipes, metallic flanged pressure pipes, and non-metallic flanged pressure pipes.

In accordance with yet an additional feature of the invention, a portion of the sleeve is one of a fabric-reinforced hose and a metallic hose, and/or a portion of the container is one of a fabric-reinforced hose and a metallic hose.

With the objects of the invention in view, there is also provided a device for impregnating an insulation of a winding bar of an electric machine, including a vacuum-tight, pressure-tight, flexible sleeve for completely surrounding and accommodating the winding bar, the sleeve defining an evacuable interior, a pressure-resistant sleeve enclosing the sleeve to form a space therebetween, the space to be charged with a first predetermined pressure, a tank for holding an impregnating agent, the tank fluidically connected to the sleeve and supplying the impregnating agent to the sleeve at a second predetermined pressure less than the first predetermined pressure, and a vacuum line fluidically connected to the interior for supplying a vacuum to the interior.

With the objects of the invention in view, there is also provided a device for impregnating an insulation of a winding bar of an electric machine, including a vacuum-tight, pressure-tight, flexible sleeve for completely surrounding and accommodating the winding bar, the sleeve defining an evacuable interior, a pressure-resistant sleeve enclosing the sleeve to form a space therebetween, the space to be charged with a first predetermined pressure, an impregnating agent supply fluidically connected to the sleeve and holding an impregnating agent at a second predetermined pressure less than the first predetermined pressure, the supply supplying the impregnating agent to the container, and a vacuum-forming device fluidically connected to the interior for supplying a vacuum to the interior.

With the objects of the invention in view, there is also provided a device for impregnating an insulation of a winding bar of an electrical machine, including a multi-part tool defining an evacuable interior to surround and accommodate the winding bar in a positive fit at least during an evacuation and impregnation process, a tank holding an impregnating agent at a predetermined pressure, the tank fluidically connected to the interior for supplying the impregnating agent to the interior at the predetermined pressure, and a vacuum line fluidically connected to the interior for supplying a vacuum to the interior.

With the objects of the invention in view, there is also provided a device for impregnating an insulation of a winding bar of an electrical machine, including a multi-part tool having an evacuable interior to surround and accommodate the winding bar in a positive fit at least during an evacuation and impregnation process, a tank holding an impregnating agent at a predetermined pressure, the tank fluidically connected to the interior for supplying the impregnating agent at the predetermined pressure, and a vacuum-forming device fluidically connected to the interior for supplying a vacuum to the interior.

With the objects of the invention in view, there is also provided a device for impregnating an insulation of a winding bar of an electrical machine, including a multi-part tool having at least first and second parts defining an evacuable interior and displaceable with respect to one another to surround and accommodate the winding bar in a positive fit at least during an evacuation and impregnation process, a tank holding an impregnating agent at a predetermined pressure, the tank fluidically connected to the interior for supplying the impregnating agent at the predetermined pressure, and a vacuum-forming device fluidically connected to the interior for supplying a vacuum to the interior.

Here, the container is a tool that is composed of several parts and that surrounds the winding bar with a positive fit in the evacuation and impregnation processes. A line of a vacuum-forming apparatus is connected to the tool interior.

In accordance with again another feature of the invention, the winding bar is a current heater and a resistance of heater represents a measure of its temperature.

In accordance with again a further feature of the invention, the container is adapted to maintain an overpressure during an impregnation process at least until the impregnation agent jellifies and hardens.

In accordance with again an added feature of the invention, the impregnation agent is a resin that hardens at room temperature.

In accordance with a concomitant feature of the invention, the insulation is at least one insulating tape containing accelerating additives.

Other features that are considered as characteristic for the invention are set forth in the appended claims.

Although the invention is illustrated and described herein as embodied in a device for impregnating an insulation of a winding bar of an electrical machine, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

DESCRIPTION OF THE PREFERRED EMBODIMENTS

Figure 1:
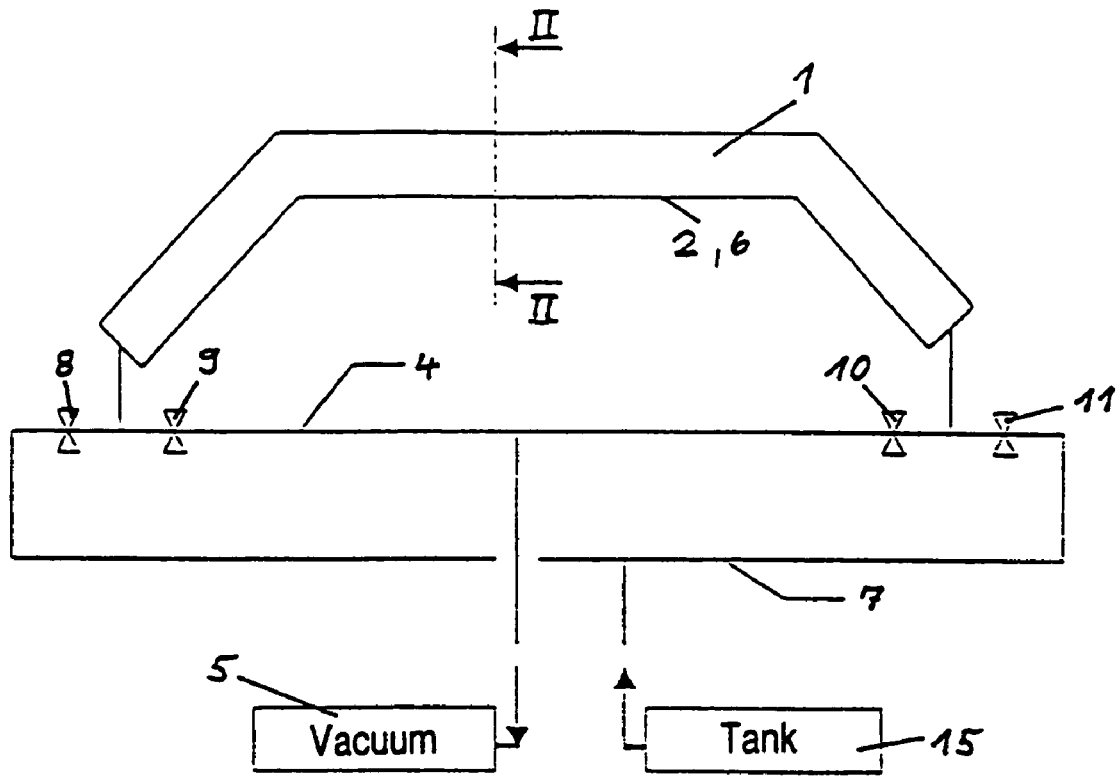
FIG. 1 is block circuit diagram and diagrammatic side view of a winding bar with the connections for vacuum formation and impregnating agent according to the invention.
Figure 2:
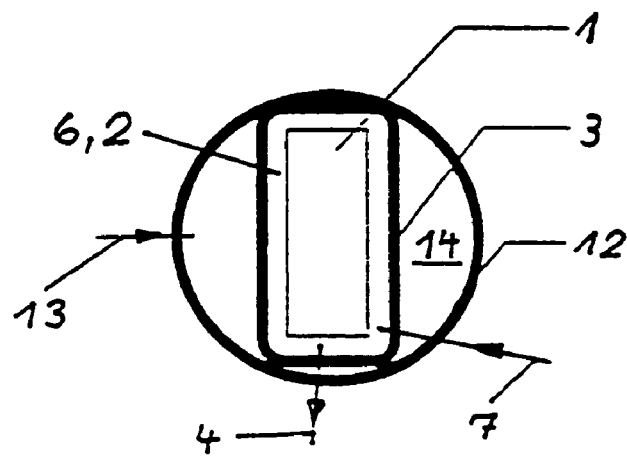
FIG. 2 is a cross-sectional view of the device according to the invention along line II—II in FIG. 1.

Referring now to the figures of the drawings in detail and first, particularly to FIGS. 1 and 2 thereof, there is shown a winding bar 1 of a stator winding of a non-illustrated electrical machine. An insulation 2 is produced by winding an insulating tape. The winding bar 1 is covered over its entire length by a flexible sleeve 3 of vacuum-tight, pressure-tight material in the form of a hose or shrink sleeve. A line 4 connects a vacuum-forming system 5 to the interior 6 of the flexible sleeve 3, the interior space being substantially the space occupied by the insulation 2. A supply line 7 for resin, which is utilized as the impregnating agent, connects a tank 15 for accommodating the resin to the interior space 6. Two valves 8,9 and 10,11 are disposed in the line 4 and the supply line 7, respectively. A pressure-resistant sleeve 12 surrounds the vacuum-tight, pressure-tight sleeve 3, which is penetrated by the line 4 and the supply line 7. A pressure-transmitting medium such as compressed air reaches the space 14 between the vacuum-tight, pressure-tight sleeve 3 and the pressure-resistant sleeve by way of a pressure line 13.

To prepare for the impregnating of the insulation 2, a predeterminable pressure is applied in space 14 between the two sleeves 3 and 12 subsequent to the evacuation of the interior space 6 of the flexible sleeve 3 through the line 4. Once the valves 8,9 in the line 4 are closed, and the valves 10,11 in the supply line 7 are opened, impregnating resin is injected from the tank 15 into the insulation 2. The feed pressure is always less than the pressure present in the pressure-conducting sleeve 12. The difference between these two pressure values corresponds to the pressure with which the impregnated insulation 2 is pressed—that is to say, compressed. Impregnation is ended when all hollow spaces in the evacuated insulation have been filled.

Besides geometric factors, the parameters of resin viscosity and impregnation pressure are decisive for the technically relevant impregnation time. Because only the amount of resin that actually penetrates the bar insulation plays a role in the process, no attention need be paid to the stability of the resin. This means that the impregnating temperature can be substantially higher (up to approximately 120 degrees Celsius) than in the prior art immersion technique, whereby a large amount of resin must be kept in an impregnation pan. Such high impregnating temperature effectuates an extremely low initial viscosity of the resin and, thus, a very fast impregnation process. Furthermore, the impregnation pressure can also be selected to be relatively high (approximately 10 bar), which provides another basis upon which a substantially faster impregnation can be achieved. The duration of the impregnation process is, thus, substantially shortened.

If thermosetting impregnating resins are utilized, it is necessary to heat the bar or the bar insulation. To this end, the winding bar and, thus, current can directly heat the impregnated winding bar insulation. If a resin that sets at room temperature is utilized, an insulating tape that contains the appropriate accelerating additive can be employed.

During the impregnation process, the overpressure in the pressure-resistant sleeve 12 is maintained until jellification and hardening of the impregnating resin. The pressure-resistant sleeve 12 can be of a flexible fabric-reinforced hose or adapted pressure pipes that are segmented or flanged. At the end of the impregnation process, with valves 8,9,10,11 closed and after the overpressure in the sleeve 12 has been neutralized, the sleeve is removed, and the winding bar 1 is withdrawn together with the sleeve 3. After the sleeve 3 is also taken off, the winding bar can be used as directed.

Figure 3:
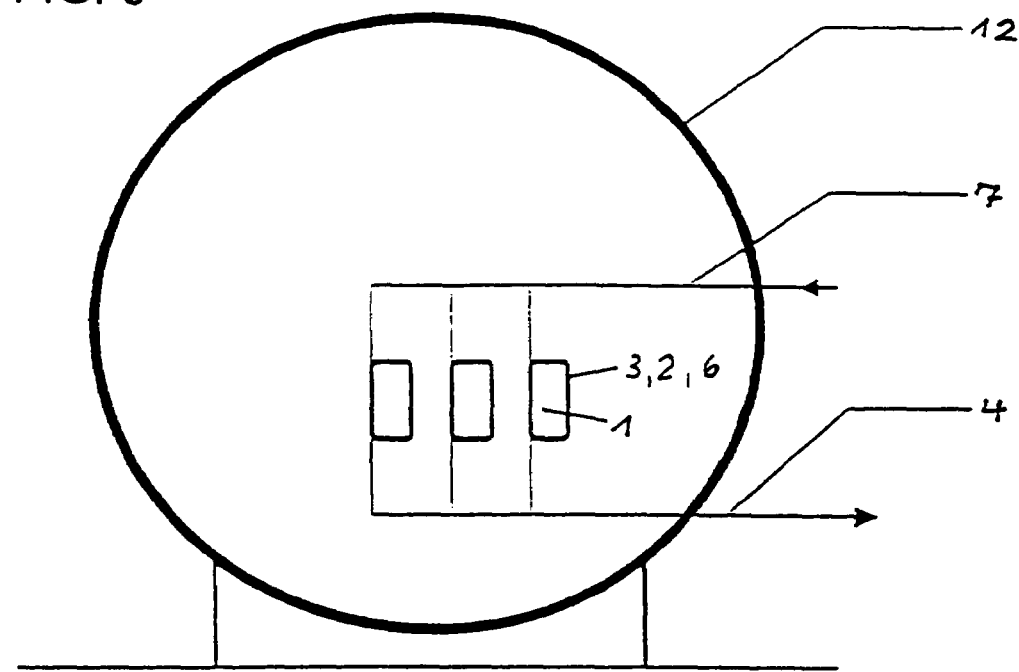
FIG. 3 is a cross-sectional view through a device for impregnating several winding bars according to the invention.

FIG. 3 represents an exemplifying embodiment wherein three winding bars 1 are impregnated at the same time. Several stub lines branch off of the line 4, so that all winding bars 1 can be evacuated simultaneously. The resin also branches from the supply line 7 into three stub lines, making possible a simultaneous resin discharge. In this exemplifying embodiment, an autoclave is utilized as the pressure-resistant sleeve 12.

Figure 4:
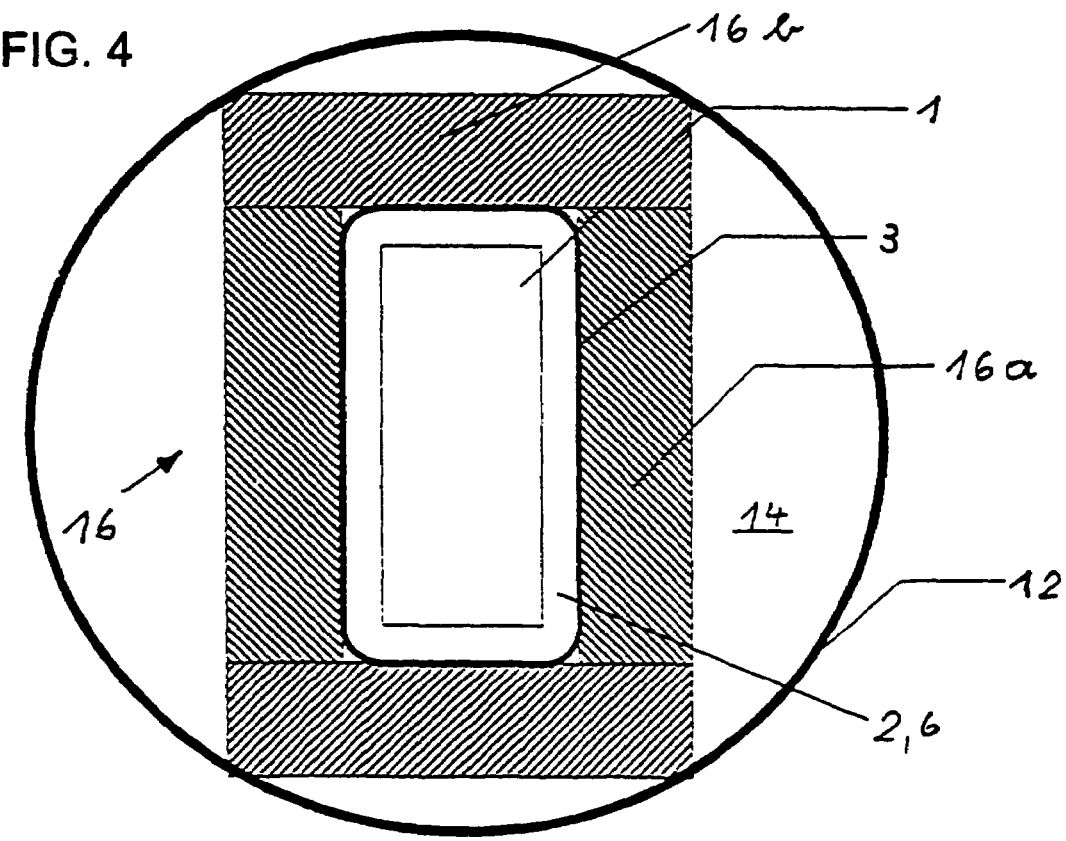
FIG. 4 is a cross-sectional view of an alternative embodiment of the device of FIG. 2.

For winding bars 1 that will be utilized in a stator, a high mechanical cross-sectional precision is required for what is referred to as the slot part of the winding bar. FIG. 4 represents a cross-section through the slot part of the winding bar, with a calibrating body 16 that surrounds the sleeve 3 with a positive fit disposed in the space 14 between the sleeves 3 and 12. The calibrating body 16 is composed of individual molded pieces 16*a*, 16*b* and guarantees the precision of the slot part.

Figure 5:
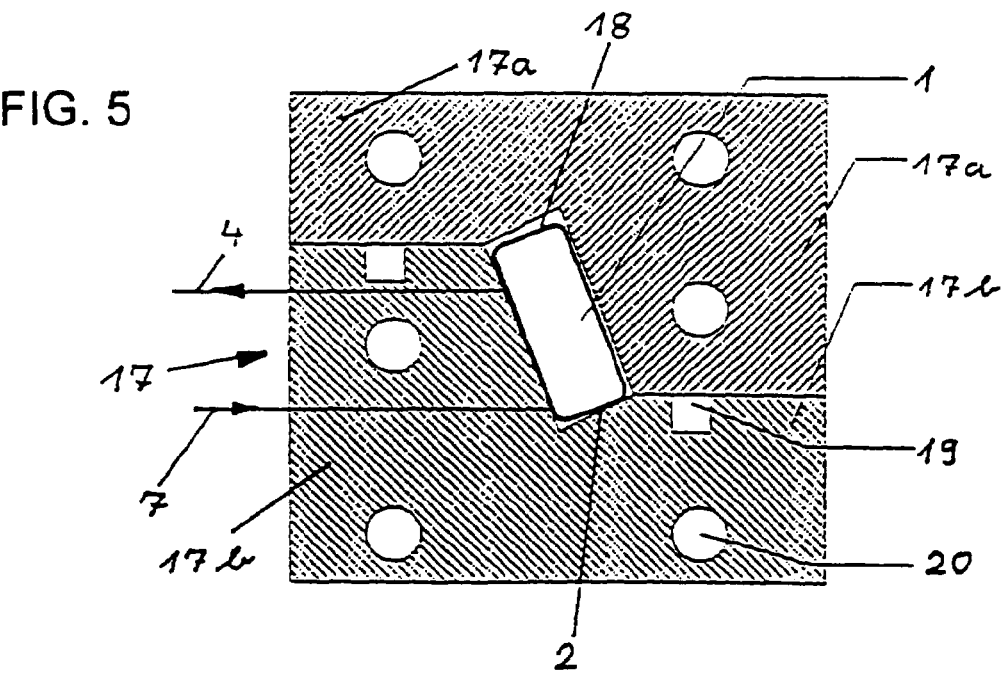
FIG. 5 is a cross-sectional view through a tool according to the invention.

According to FIG. 5, a tool 17 is provided that accommodates the winding bar 1 that is provided with the insulation 2 in a tool nest with a positive fit. The tool 17 has a top part 17*a* and a bottom part 17*b* that are connected non-positively to one another by a non-illustrated screw connection, with a circumferential seal 19 interposed therebetween. The chamber formed by the tool nest 18 encloses the insulation 2 of the winding bar 1 with a predeterminable play. After the chamber is evacuated with the aid of the line 4, the impregnating resin is fed in over the supply line 7 until the insulation and its hollow spaces are impregnated. Heating or cooling systems for supporting the impregnating or curing processes are disposed in channels 20. The tool 17 is completely closed during the evacuating process and the filling with impregnating resin, and, thus, emissions cannot escape.

Figure 6:
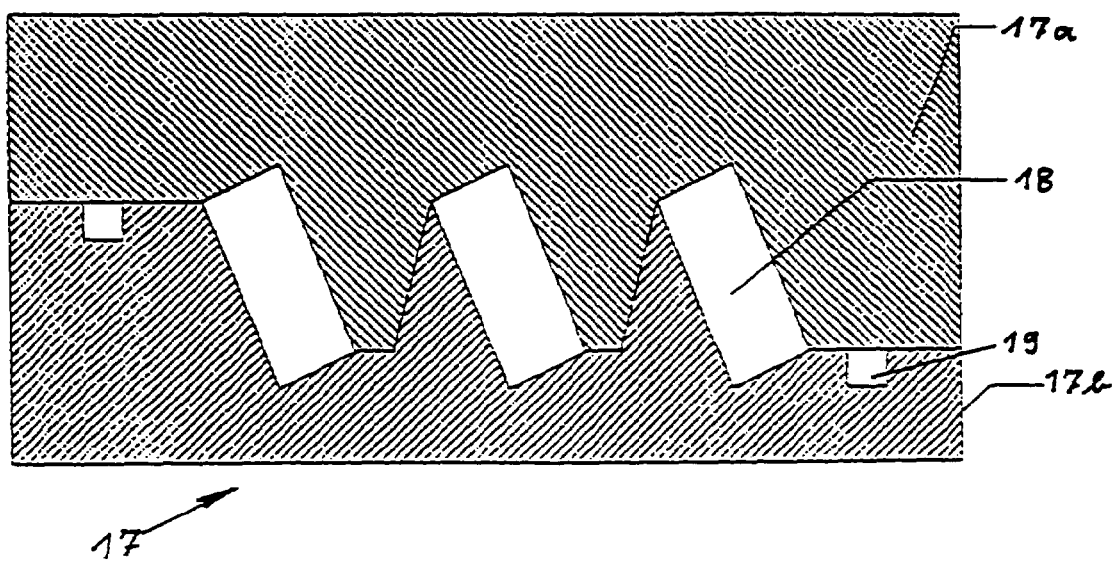
FIG. 6 is a cross-sectional view through a multi-impression mold according to the invention.

FIG. 6 represents a tool 17 with several nests 18, so that a corresponding number of non-illustrated winding bars can be evacuated and impregnated simultaneously. Here also, top and bottom parts 17*a*, 17*b* are connected to one another non-positively, with a surrounding seal 19 interposed therebetween.

I claim:

1. A device for impregnating an insulation of a winding bar of an electrical machine, comprising:
    a multi-part tool defining an evacuable interior to surround and accommodate the winding bar in a positive fit at least during an evacuation and impregnation process, said multi-part tool formed of all rigid parts;
    a tank holding an impregnating agent at a predetermined pressure, said tank fluidically connected to said interior for supplying the impregnating agent to said interior at the predetermined pressure; and
    a vacuum line fluidically connected to said interior for supplying a vacuum to said interior.

2. The device according to claim 1, wherein the winding bar is a current heater and a resistance of said current heater represents a measure of a temperature of said current heater.

3. The device according to claim 1, wherein said multi-part tool maintains an overpressure during an impregnation process at least until the impregnation agent jellifies and hardens.

4. The device according to claim 1, wherein the impregnation agent is a resin that hardens at room temperature.

5. The device according to claim 1, wherein the insulation is at least one insulating tape containing accelerating additives.

6. A device for impregnating an insulation of a winding bar of an electrical machine, comprising:
    a multi-part tool having an evacuable interior to surround and accommodate the winding bar in a positive fit at least during an evacuation and impregnation process, said multi-part tool formed of only rigid parts;
    a tank holding an impregnating agent at a predetermined pressure, said tank fluidically connected to said interior for supplying the impregnating agent at the predetermined pressure; and
    a vacuum-forming device fluidically connected to said interior for supplying a vacuum to said interior.

7. A device for impregnating an insulation of a winding bar of an electrical machine, comprising:
    a multi-part tool having at least first and second parts defining an evacuable interior and displaceable with respect to one another to surround and accommodate the winding bar in a positive fit at least during an evacuation and impregnation process, said first and second parts being rigid parts;
    a tank holding an impregnating agent at a predetermined pressure, said tank fluidically connected to said interior for supplying the impregnating agent at the predetermined pressure; and
    a vacuum-forming device fluidically connected to said interior for supplying a vacuum to said interior.

* * * * *